Patented Sept. 13, 1949

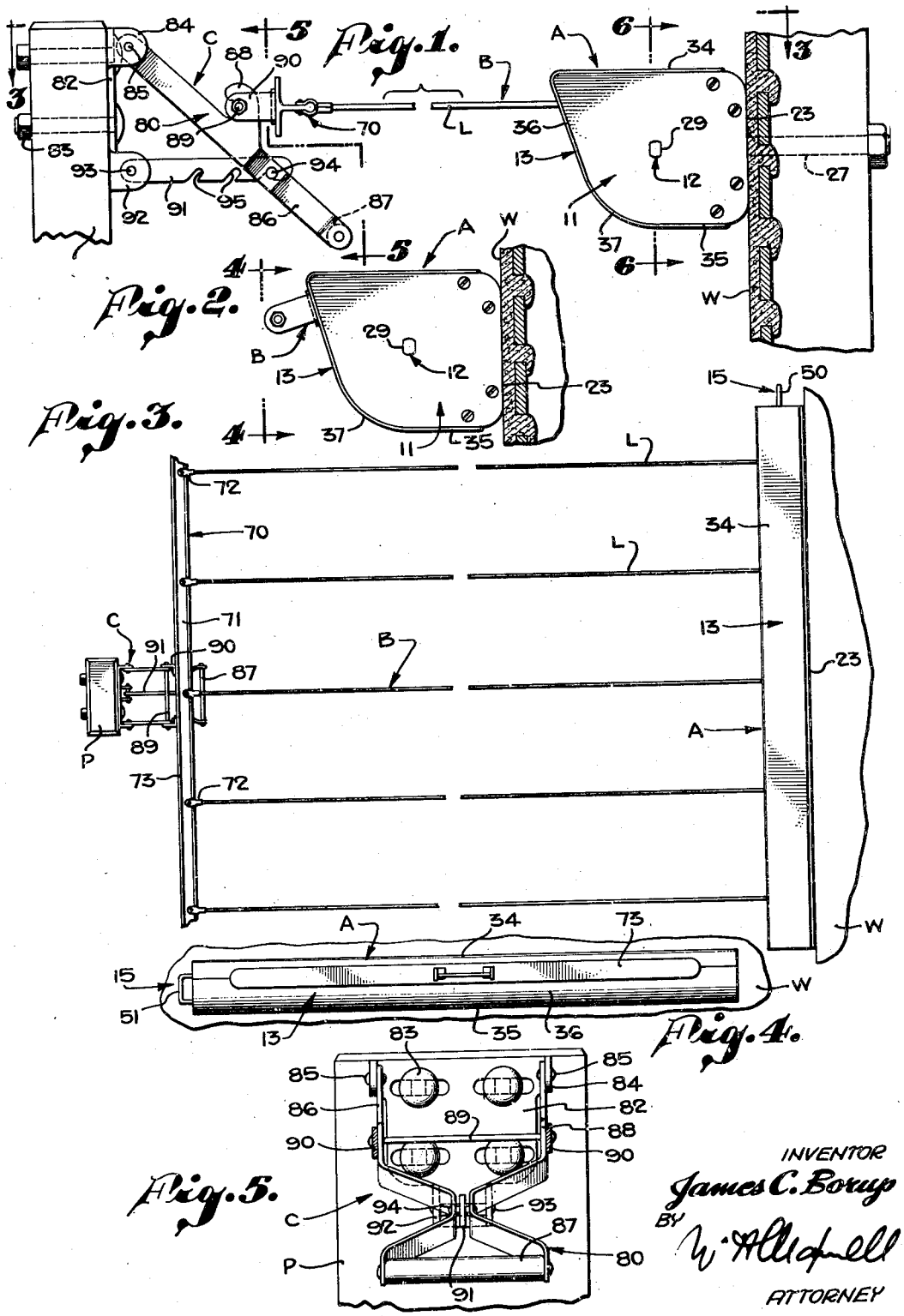

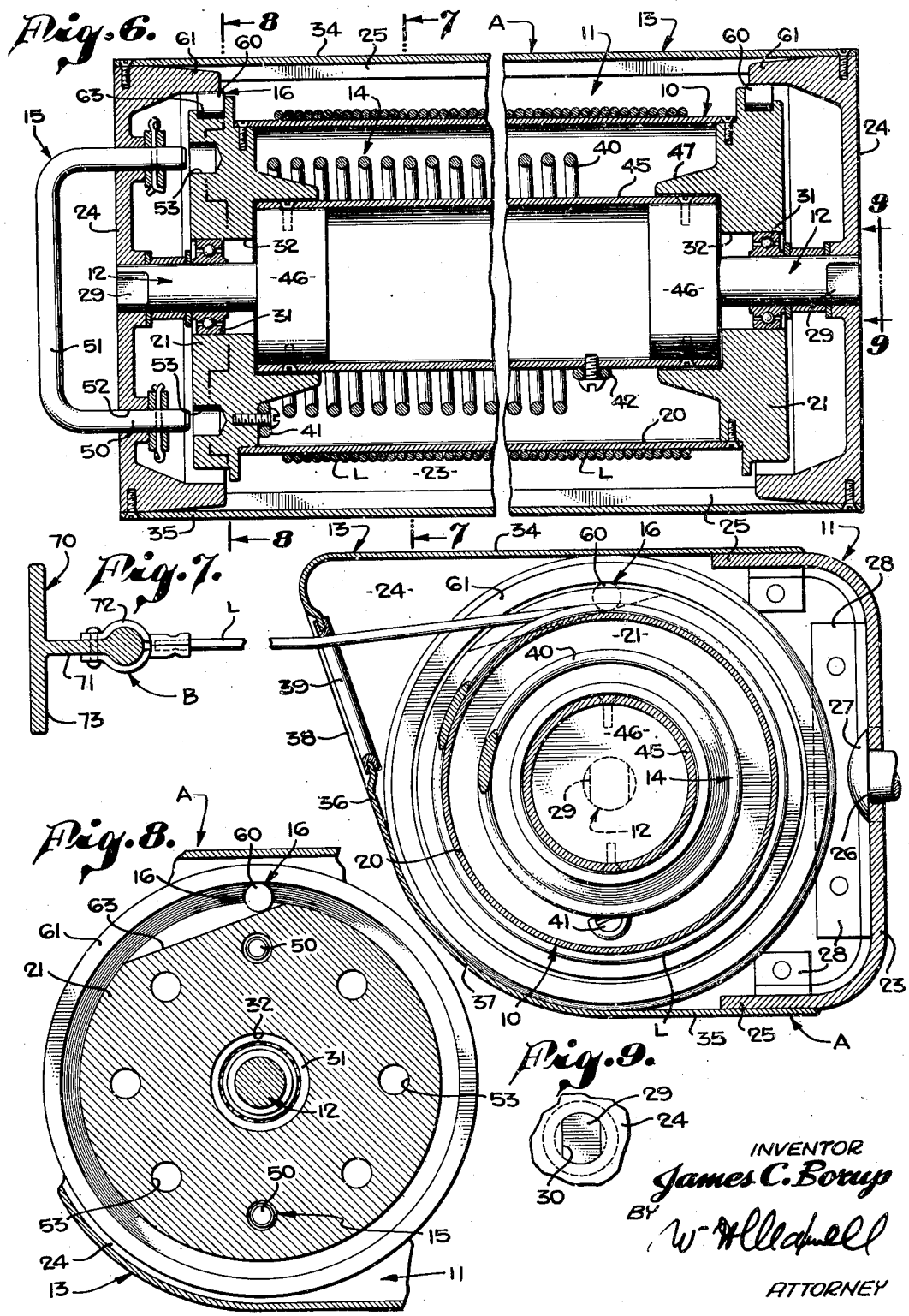

2,481,638

UNITED STATES PATENT OFFICE 2,481,638

RETRACTABLE CLOTHESLINE

James C. Borup, Sherman Oaks, Calif., assignor to Bocaroy Manufacturing Corporation, Los Angeles, Calif., a corporation of California Application October 28, 1947, Serial No. 782,573

11 Claims. (Cl. 211—119.15)

This invention relates to a retractable clothes line, and it is an object of the invention to provide a simple, practical, easily operated mechanism involving one or more lines suitable for use as clothes lines.

A general object of the present invention is to provide a mechanism of the general character referred to involving a plurality of lines carried on a single spool and simultaneously operable to an extended operating position where they are tight and parallel.

Another object of the present invention is to provide a mechanism of the character referred to involving a simple compact housing construction for the line carrying spool and serving to protect the lines when they are not in use so that they remain clean and always ready for immediate use.

Another object of the present invention is to provide a mechanism wherein the housing has a line aperture passing the several lines from the housing, which aperture is closed by the cross arm that carries the outer ends of the lines when the lines are in a retracted position.

Another object of this invention is to provide a mechanism of the general character referred to wherein the fastener for receiving the line carrying cross arm is operable to tension the lines so that they may be readily established in a taut condition.

Another object of the invention is to provide a mechanism of the general character referred to wherein there is a manually operable lock for the spool that may be set to hold the spool against operation so the lines are held taut.

A further object of the invention is to provide a mechanism of the general character referred to including a safety catch in connection with the spool checking it against operation at an excessive speed.

The various objects and features of my invention will be fully understood from the following detailed description of a typical preferred form and application of the invention, throughout which description reference is made to the accompanying drawings, in which:

Fig. 1 is a view illustrating a typical installation of the apparatus or mechanism embodying the present invention the spool unit of the mechanism being shown carried by a wall while the fastener that receives and holds the line assembly is shown carried by a post. Fig. 2 is a view of a portion of the part shown in Fig. 1, being a view of the spool unit showing the line assembly fully retracted so that the cross arm thereof closes the housing of the spool unit. Fig. 3 is a reduced plan view of the parts shown in Fig. 1, being a reduced view taken as indicated by line 3—3 on Fig. 1. Fig. 4 is a reduced front elevation of the structure shown in Fig. 2 being a view taken as indicated by line 4—4 on Fig. 2. Fig. 5 is a detailed view taken as indicated by line 5—5 on Fig. 1. Fig. 6 is an enlarged detailed sectional view of the spool unit being a view taken as indicated by line 6—6 on Fig. 1. Fig. 7 is a transverse sectional view of the structure shown in Fig. 6, being a view taken as indicated by line 7—7 on Fig. 6. Fig. 8 is a detailed transverse view of a part of the mechanism taken substantially as indicated by line 8—8 on Fig. 6, and Fig. 9 is a detailed view taken as indicated by line 9—9 on Fig. 6.

The mechanism of the present invention involves, generally, a spool unit A applicable to a fixed support such as a wall W or the like, a line assembly B anchored to and handled by the spool unit, and a releasable fastener C applicable to a fixed support such as a post P or the like, and adapted to receive and hold the outer end of the line assembly. The mechanism of the present invention is such that it may be used or installed in various situations or locations as for instance between spaced walls, posts, or other such supports. For sake of example the spool unit A is shown applied to a wall W while the fastener C is shown applied to a post P. When the mechanism is in operating position or is in condition for use the line assembly is extended so that it extends between the spool unit A and the fastener C, as shown in Figs. 1 and 3 of the drawings, whereas when the mechanism is not in use the line assembly is retracted to be housed by or within the spool unit A, the fastener C being left remote from the spool unit A to remain on the support or post P.

The spool unit A involves, generally, a simple spool 10, a mounting bracket 11, trunnions 12 projecting from or carried by the bracket 11 and carrying the spool 10, and a cover 13 applicable to the bracket 11 and cooperating therewith to form a housing. The unit A further includes a spring means 14 normally yieldingly tending to rotate the spool in a position to wind the line assembly thereon, lock means 15 preferably such as to be manually operable and acting to lock the spool 10 against rotation, and stop means 16 operable to stop the spool in order to check excessive rotation thereof.

The spool 10 is primarily a mounting or carrier for the several lines L of the line assembly B. In the particular case illustrated the spool is shown as involving a cylindrical rim 20 carried by and between end plates or discs 21. The rim 20 is preferably a shell-like structure of such size and length as to adequately accommodate the lines L of the assembly B and to be properly accommodated in the housing established by the bracket 11 and cover 13.

The mounting bracket 11 may vary widely in form and construction. However, it is preferred that it be such as to involve an elongate base plate 23 and projecting arms 24 at the ends of the base plate. The arms form ends or end plates for the housing. In the particular case illustrated the base plate 23 is channel-shaped in cross section so that it has projecting flanges 25 to which the cover 13 may be readily attached. The plate 23 may be provided with suitable openings 26 to receive suitable fasteners 27 by which the spool unit is attached to the support, as for instance, to a wall W. In the case illustrated the fasteners 27 are shown as bolts rigidly and permanently securing the base plate to the wall. The arms 24 are forwardly projecting parts located at the ends of the plate 23 and may be rigidly joined to the base plate in any suitable manner. In the case illustrated the arms are hown as parts formed separate from the base plate 23, in which case they may be joined to the base plate by suitable connecting brackets 28.

The trunnions 12 provided for carrying the spool 10 are supported by the arms 24 to project inwardly therefrom or toward each other from the inner sides of the arms and so that they are supported on a common axis being the axis on which the spool rotates. In the case illustrated the trunnions 12 are rigidly carried by the arms 24 and they are shown as having flat sided heads 29 carried in suitably shaped openings 30 in the arms 24 so that they are positively held against rotation.

The spool 10 is supported by and between the trunnions 12 and so that it is freely rotatable on the trunnions. In the preferred construction the mounting of the spool is through anti-friction bearings 31 in which case the inner races of the bearings are supported on the trunnions while the outer races of the bearings are held in openings 32 formed centrally in the plates 21 of the spool.

The cover 13 is preferably formed or designed to fit and cooperate with the bracket construction hereinabove described to cooperate therewith in forming a suitable housing carrying the spool and other parts of the unit A. In the particular case illustrated the cover is a sheet metal part involving a top 34, a bottom 35 and a front 36. The top 34 and bottom 35 are horizontal parts joined to the flanges 25 of the base plate 23 and they project forwardly as shown in Fig. 7. The front 36 extends between the outer or projecting end portions of the top and bottom and in the case illustrated is inclined to extend downwardly and somewhat inwardly as it extends from the forward end of the portion of the top 34 to the bottom 35, there being a rounded corner portion 37 connecting the front 36 and bottom 35, which corner portion is concentric with the spool located within the housing.

A feature of the front 36 of the cover 13 is the line opening 38 provided in the front 36 extending longitudinally thereof to accommodate the several lines L and the cross arm of the line assembly, as will be hereinafter described. In the particular case illustrated the line opening 38 is provided with a suitable reinforcing frame 39.

The spring means 14 for operating the spool 10 normally tends to turn the spool in a manner to wind the lines L onto the spool. In the preferred construction this means involves a single spring 40 preferably a helical spring arranged longitudinally of the spool and concentric therewith, and within the rim 20 of the spool. In the particular case illustrated one end of the spring 40 is anchored at 41 to one of the end plates 21 of the spool. The other end of the spring is anchored at 42 to a suitable fixed part. In the particular case illustrated the part to which the spring is anchored is a core member 45 arranged concentrically within the spool and carried by heads 46 on the inner ends of the trunnions 12. Spring guiding flanges 47 extend inwardly from the plates 21 to overlie the end portions of the member 45. The flanges 47 are concentric with and surround the member 45 with some clearance, see Fig. 6.

The lock means 15 is a manually operable element of the mechanism operable to engage the spool and positively stop it against rotation. This means includes one or more lock pins 50 carried by the housing and operable by a handle 51 to engage the spool. In the particular case illustrated there are two like diametrically opposite lock pins 50 carried in guide openings 52 in one arm 24 of bracket 11. The guide openings 52 are parallel with each other and with the axis of the spool so that the inner ends of the pins 50 face one end of the spool. The end plate 21 of the spool opposed by the pins 50 is provided with sockets 53 for receiving the ends of the pins when the lock means is actuated. A single handle 51 connects the outer ends of the pins 50 to the exterior of the arm 24 which carries the pins. To operate the means 15 it is merely necessary to engage the handle 51 and move the pins 50 inwardly so that they enter the sockets 53. With the pins engaged in the sockets 53 the spool is positively locked against rotation.

The safety stop 16 is designed to prevent the spool from operating at an excessive speed. In the case illustrated this means involves stop rollers 60 between the end plates 21 and overlying flanges 61 on the inner sides of the arms 24 of the bracket 11. The periphery of each end plate 21 is concentric with the spool and is recessed at 63 to carry a roller 60. The bottom of the recess is cut away or provided with a flat portion normally accommodating the roller. The flat part is tangential to the axis of the spool. The flanges 61 overlie the roller carrying peripheral portions of the end plates or discs 21 and when the spool rotates in excess of a given speed centrifugal force throws the rollers out so that they wedge between the end plates and the flanges 61, stopping rotation of the spool.

The line assembly B preferably includes a plurality of like lines L and a common or single cross arm 70 to which the outer end of each line is attached. The inner ends of the lines are anchored to the spool 10 of unit A. It is preferred in practice that the lines be arranged and related so that they are substantially parallel and they may be equally spaced apart as shown in Fig. 3 of the drawings. The cross arm 70 is preferably a beam like member of such form as to be rigid and is such as to cooperate with the front 36 of unit A so that when the lines are retracted or wound onto the spool 10 the cross arm forms a cover or closure for the opening 38 in the front 36. In the case illustrated the cross-arm is shown as T- shaped in cross section, in which case it has a rib 71 to which the lines L are connected by means of suitable fasteners 72 and it has a flat-sided body 73 of such length and width as to fit over and cover the opening 38 when the rib is positioned to project into the housing through the opening.

The releasable fastener C preferably involves a pivoted hand lever 80, means releasably coupling the cross-arm 70 to the hand lever, and a latch for holding the hand lever in an operated position. In the preferred construction illustrated the fastener includes a base plate 82 adapted to be coupled to a suitable support such as a post by fasteners 83. Ears 84 project from the plate 82 and carry pins 85 that carry the hand lever 80. The hand lever 80 is shown as divided into spaced arms 86, the inner ends of which are connected to ears 84 by the pins 85. A handle 87 is carried between the outer ends of the arms 86.

The means provided for releasably coupling the cross arm 70 to the hand lever is preferably a hook means and as shown in the drawings may involve a hook 88 projecting from each arm 86 of the hand lever in a manner to receive and hold a rod 89 carried by the arm 70 through brackets 90. The rod 89 is carried midway between the ends of the cross arm 70 to be spaced from the side of the body 73 opposite that from which the rib 71 projects. The hooks 88 are preferably located at an intermediate point between the ends of the lever 80 so that a person operating the lever through the handle 87 has a distinct mechanical advantage in operating the lever to move the cross arm.

The latch provided for holding the lever 80 is shown as including a ratchet arm 91 pivoted to ears 92 on the base 82 by a pivot pin 93. The arm 91 engages over a pin 94 carried between the arms 86 and has ratchet notches 95 in its lower edge engageable with the pin 94. The ratchet arm 91 is freely pivoted so that it normally is held in engagement with the pin 94 through the action of gravity. As the arm 80 is operated to tighten the lines B, that is, when it is swung in the direction indicated by the arrow in Fig. 1, it is successively engaged in the notches 95 and when the pin 94 is received in a notch 95 the outward or return movement of the arm 80 is prevented. To release the arm 80 for outward movement it is merely necessary to lift the ratchet arm 91 to disengage it from the pin 94.

In using the mechanism of the present invention the spool unit A and the fastener C are mounted on suitable supports in spaced relation and preferably at about the same level or in a common horizontal plane. When the device is not in use the fastener C is entirely disconnected from the unit A and the lines L of the line assembly are wound on the spool 10 while the cross arm 70 closes the opening 38 in the housing of unit A. To put the lines in condition for use, assuming the lock means 15 to be released as shown in Fig. 6, the operator grasps the cross arm 70 of the line assembly and withdraws the lines L from the spool, causing rotation of the spool against the resistance of the spring 40 until the cross arm is in position to be engaged with the hooks 88 of means C. The operating arm 80 of means C is in an extended position such as is shown in Fig. 1 when initially engaged by the cross arm of the line assembly. With the parts in this position the lock means 15 is set or engaged, stopping any further rotation of the spool or further withdrawal of the lines from unit A. To tension the lines the lever 80 is swung down or in the direction indicated by the arrow in Fig. 1, and as such movement of the arm occurs the latch arm 90 holds the arm 80 operated through the ratchet action above described. The apparatus is then in condition for use and with the lines L extended and taut it is effective for carrying clothes or the like.

To release the apparatus after the use of the lines has been completed the lock means 15 is disengaged and the ratchet arm 91 is disengaged, allowing the cross arm 70 to be freed from the hooks 88. The spring 40 tensioned during withdrawal of the lines then acts to rotate the spool winding the lines onto the spool until such time as the cross arm reaches the front 36 of the unit A. In the fully returned position the body 73 of the cross arm 70 closes the opening 38, thus sealing the line carrying spool so that dirt or foreign matter does not reach the lines. Should the cross arm 70 be accidentally released or should there be a tendency to return the lines at an excessive speed, the safety means 16 acts to check rotation of the spool.

Having described only a typical preferred form and application of my invention, I do not wish to be limited or restricted to the specific details herein set forth, but wish to reserve to myself any variations or modifications that may appear to those skilled in the art and fall within the scope of the following claims:

Having described my invention, I claim:

1. A spool unit including, a housing having a base plate with projecting arms and a cover attached to the plate and having a line passing opening, a spool in the housing rotatably supported on said arms, a core fixed to the arms and located within the spool, a spring surrounding the core and having one end attached to the core and the other end attached to the spool, and a manually operable lock mounted in one of said arms and engageable with the spool to set it against rotation.

2. A spool unit including, a housing having a stationary base plate with spaced arms, rigid inwardly projecting trunnions on said arms and a cover attached to the plate and having a line passing opening, a spool in the housing rotatably supported on said trunnions, and springs means within the spool normally tending to rotate it, and a manually operable lock carried by one of said arms and engageable with the spool to hold it against rotation.

3. A spool unit including, a housing having a base plate with spaced arms, inwardly projecting trunnions on the arms and a cover attached to the plate and having a line passing opening, a spool in the housing rotatably supported on the trunnions, a spring within the spool normally tending to rotate it, said spring being connected to said spool and one of the trunnions, a centrifugally operated safety stop for the spool, said safety stop being mounted on the spool and engaging one of said spaced arms and a manually operable lock carried by one arm engageable with the spool to hold it against rotation.

4. In a device of the character described applicable to spaced supports, a spool unit applicable to one support and including a rotatable spring loaded spool and a housing for the spool and having a line passing opening therein, a line having its inner end fixed to the spool unit and normally wound on the spool, and a releasable fastener mounted on a cross arm and applicable to the other support, said cross arm holding the outer end of the line when the line is extended from the spool, said cross arm closing the said opening in the housing when the line is fully wound on the spool, said housing including two elongate channel shaped opposed sections with engaged flanges and projecting arms on one of said sections closing the ends of the structure formed by the sections, said projecting arms supporting said spool, said line passing opening being in a part of the other section, said part extending downwardly and inwardly.

5. In a device of the character described, a line carrying spool, and a housing enclosing the spool and including two channel shaped opposed sections and end arms, the sections having engaged flanges and one section being a mounting bracket, said bracket carrying said end arms and having means to support said spool and the other section being a cover secured to the end arms and having a line passing opening therein.

6. In a device of the character described, a line carrying spool, and a housing enclosing the spool and including two channel shaped opposed sections, one channel shaped section being a mounting bracket with a vertical portion and having integral horizontal flanges projecting forwardly from the upper and lower edges of the vertical portion and end arms having means supporting said spool and the other channel shaped section being a cover with a front portion having a line passing opening therein and having flanges integral with said front portion and projecting from said front portion and engaged with said flanges on said mounting bracket.

7. In a device of the character described, a spool carrying a line, a housing enclosing said spool and having end arms with inwardly projecting trunnions having means including end plates rotatably supporting the spool, a core carried by said end plates, said core being disposed within said spool, and a spring surrounding the core with one end anchored to said core and the other end attached to said spool, there being spring guiding flanges on said end plates overly the end portions of the core.

8. In a device of the character described, a spool carrying a line, a housing enclosing the spool and having end arms with inwardly projecting trunnions having means including end plates rotatably supporting the spool, a core carried by said trunnions and located within the spool, and a spring surrounding said core with one end anchored to said core and the other end attached to said spool, the trunnions being non-rotatably mounted in openings in said end arms and projecting from said end arms through said end plates of the spool, there being heads on the trunnions supporting the core.

9. In a device of the character described, a housing having end arms with aligned openings, trunnions carried in said openings and projecting inwardly from said end arms, a spool including end plates rotatably mounted on said trunnions and a cylindrical part carried by and extending between said end plates, a line carried by said cylindrical part, a core carried by and extending between said trunnions, and a spring around said core with one end anchored to said core and the other end attached to said spool, said end arms having flanges projecting over said end plates, said flanges confining said line to the spool.

10. In a device of the character described, a housing having end arms with aligned openings, trunnions carried in said openings and projecting inwardly from said end arms, a spool including end plates rotatably mounted on said trunnions and a cylindrical part carried by and extending between said end plates, a line carried by said spool, a core within the spool carried by and extending between said trunnions, and a spring around said core with one end anchored to said core and the other end attached to said spool, said end plates having spring guiding flanges projecting over the end portions of said core, and said end arms having flanges projecting beyond the ends of said spool, said last-named flanges confining the line to the spool.

11. In a device of the character described, a housing comprising end arms with aligned openings and having two sections extending between the end arms, one section being a mounting section and the other being a cover section, trunnions carried in the openings and projecting inwardly from the end arms, a spool including discs rotatably mounted on the trunnions and a cylindrical part carried by and extending between the discs, a line carried by the spool, a core within the spool carried by and extending between the trunnions, and a spring around the core with one end anchored to the core and the other end attached to the spool, the housing completely encasing the spool and the sections of the housing having engaging flanges extending between the end arms.

JAMES C. BORUP.

REFERENCES CITED

The following references are of record in the file of this patent:

UNITED STATES PATENTS

| Number | Name | Date |
|---|---|---|
| 662,222 | Cook | Nov. 20, 1900 |
| 898,051 | Lemon | Sept. 8, 1908 |
| 1,130,063 | Buch | Mar. 2, 1915 |
| 1,153,829 | Rueckert | Sept. 14, 1915 |
| 1,235,219 | Madden | July 31, 1917 |
| 1,481,940 | Turnepseed | Jan. 29, 1924 |
| 1,566,702 | Simmons | Dec. 22, 1925 |
| 1,777,784 | Cole | Oct. 7, 1930 |
| 1,841,412 | Leicht | Jan. 19, 1932 |
| 1,979,627 | Kozak | Nov. 6, 1934 |
| 2,166,771 | Robertson | July 18, 1939 |
| 2,206,174 | Falk | July 2, 1940 |
| 2,370,520 | Bondel | Feb. 27, 1945 |